(12) United States Patent
Liang et al.

(10) Patent No.: US 10,378,995 B2
(45) Date of Patent: Aug. 13, 2019

(54) WAVEFRONT TESTING SYSTEM

(71) Applicant: TONTA ELECTRO OPTICAL CO., LTD., Taichung (TW)

(72) Inventors: Chao-Wen Liang, Taichung (TW); Chin-Chang Liang, Taichung (TW)

(73) Assignee: Tonta Electro Optical Co., Ltd., Taichung (TW)

( * ) Notice: Subject to any disclaimer, the term of this patent is extended or adjusted under 35 U.S.C. 154(b) by 0 days.

(21) Appl. No.: 16/100,426

(22) Filed: Aug. 10, 2018

(65) Prior Publication Data

US 2019/0086290 A1  Mar. 21, 2019

(30) Foreign Application Priority Data

Sep. 15, 2017  (TW) .............................. 106131775 A

(51) Int. Cl.
*G01B 9/00* (2006.01)
*G01M 11/02* (2006.01)

(52) U.S. Cl.
CPC .............................. *G01M 11/0257* (2013.01)

(58) Field of Classification Search
CPC ................................................. G01M 11/0257
USPC ......................................................... 356/124
See application file for complete search history.

(56) References Cited

U.S. PATENT DOCUMENTS 5,448,053 A * 9/1995 Rhoads .................... G01J 9/00
250/201.9

* cited by examiner

*Primary Examiner* — Roy M Punnoose
(74) *Attorney, Agent, or Firm* — Rosenberg, Klein & Lee

(57) ABSTRACT

An optical wavefront testing system includes a light source, an image capturing unit and a processing unit. The image capturing unit includes a lens array and a sensor module that is configured to detect light rays passing through an optical element and the lens array. The processing unit controls the sensor module to detect the light rays under a plurality exposure conditions for generating a plurality of images each including a plurality of light spots, obtains a plurality of light spot datasets corresponding to the light spots and each including a plurality of pixel coordinate sets and a plurality of pixel values, and obtains wavefront information associated with the light spots based on the light spot datasets of at least two of the images.

20 Claims, 11 Drawing Sheets

Diameter of light beam

WAVEFRONT TESTING SYSTEM

CROSS-REFERENCE TO RELATED APPLICATION

This application claims priority of Taiwanese Patent Application No. 106131775, filed on Sep. 15, 2017.

FIELD

The disclosure relates to an optical testing system, and more particularly to a wavefront testing system.

BACKGROUND

In a Gaussian optical system, an optical element (e.g., a lens) is considered ideal and free from optical aberration. That is to say, when light generated by a point source of light located in an object space propagates through the optical element in the form of spherical waves, the spherical waves converge into an infinitely small image point (i.e., an ideal convergent wavefront) in a corresponding image space. In reality, an incident wavefront passing through the optical element to an exit pupil, also known as a spherical wavefront, has an optical path difference (OPD) compared with the ideal convergent wavefront, so a convergent wavefront is not able to converge into an infinitely small image point, resulting in a blurred image point and aberration. The OPD may be present due to a number of reasons, such as a non-ideal shape of the optical element attributed to errors in a manufacturing process of the optical element, an error in alignment between two surfaces of the lens, a non-uniform distribution of the optical material, a misalignment error among elements in the optical system, etc. Therefore, in the manufacturing process of the optical element, optical metrology devices such as an interferometer or a wavefront sensor may be employed to evaluate and verify transmitted wavefront of the optical element.

FIG. 1 illustrates a Hartmann-Shack wavefront optical testing system 1 as disclosed in U.S. Pat. No. 6,130,419. The optical testing system 1 includes a light source 11, a null corrector 12, a to-be-tested optical element 13, a collimator 14, a micro-lens array 15, an image sensor 16 and a processing unit 17. The image sensor 16 may include a charge-coupled device (CCD) and/or a complementary metal-oxide-semiconductor (CMOS) sensor (not shown in the drawings). The micro-lens array 15 includes a plurality of lenses 151. The light source 11 generates a uniform light beam that propagates into the null corrector 12, resulting in a corrected wavefront that can be used to compensate the optical aberration, mostly spherical aberration, generated from the to-be tested optical element 13. The corrected wavefront passes through the to-be-tested optical element 13, converges before passing through the collimator 14, and subsequently becomes collimated before entering the micro-lens array 15. The image sensor 16 detects the light projected thereon from the micro-lens array 15, forming at least one image within the range of the light beams. The image includes a plurality of light spots. Specifically, light passing through each of the lenses 151 of the micro-lens array 15 converges into a plurality of light spots, and the irradiance of the light spots may be taken as a wavefront intensity of a light beam from a corresponding one of the lenses 151 of the micro-lens array 15. The processing unit 17 calculates, for each of the light spots, an intensity centroid based on at least one coordinate set and an irradiance of the light spot. One way to calculate the intensity centroid may be employing a center-of-mass algorithm, as described in equation (1) in U.S. Pat. No. 6,130,419. Using the intensity centroid, a displacement of each of the light spots from its ideal position may be obtained precisely. In turn, the displacement of each of the light spots may be used to determine a wavefront slope of the light beam passing through a corresponding lenses 151. The complete wavefront is then reconstructed from the all the local wavefront slopes. The local wavefront phase at the corresponding lenses 151 is then determined. Therefore, by inspecting the irradiance and the displacement of each of the light spots, wavefront information on the corresponding one of the lenses 151 such as a wavefront slope, a wavefront phase and a wavefront intensity may be obtained.

In measuring wavefront aberration of different optical elements, the null corrector 12 and the collimator 14 may need to be customized and manufactured individually, such that when a light beam passes through the null corrector 12, optical aberration complementary to that of the to-be-measured optical element is created to compensate the aberration generated from the to-be-measured optical element.

The unbalanced aberration, specifically, the spherical aberration, in the optical system causes the pupil distortion between the entrance pupil and the exit pupil of the optical system. Since the aberration is balanced between the null corrector 12 and the to-be-tested optical element 13, the pupil distortion is therefore minimized. As a result, the ray distribution of the light beam after passing through the collimator 14 is as uniform as the ray entering the null corrector 12 as shown in the FIG. 1. Additionally, the wavefront intensity distribution of the light beam before arriving at the micro-lens array 15 may be expressed by the graph shown in the FIG. 2, indicating that the intensity distribution is substantially uniform. FIG. 3 illustrates a resulting image detected by the image sensor 16 and including a plurality of light spots having substantially the same spot irradiance.

It is noted that the manufacturing and subsequent alignment of the null corrector 12 and the collimator 14 brings additional costs. Moreover, the null corrector 12 and the collimator 14 themselves may not be fabricated to perfection, and may also have defects that cause transmitted wavefront distortions, reducing the measurement accuracy of the optical testing system 1. It is then desirable that the null corrector 12 and the collimator 14 can be removed from the optical testing system 1 to eliminate the potential issues as described above.

Nonetheless, without the null corrector 12, the aberration contributed from the to-be-tested optical element 13 is not balanced. The resulting pupil distortion causes a difference between the direction of propagation of a light ray located at the periphery of the light beam and that of the light ray located at the center of the light beam. Therefore, the ray distribution of the wavefront entering the micro-lens array 15 is not uniform. As a result, the irradiance of the light spots focused by the micro-lens array 15 is not uniform. Specifically, referring to FIG. 4, in a case that the to-be-tested optical element 13 has, for example, spherical aberration, an intensity of a wavefront entering the micro-lens array 15 may be in the shape of a Gaussian function with a narrower width shown in FIG. 5, indicating that the distribution of the wavefront intensity is not uniform. FIG. 6 illustrates an exemplary resulting image that is detected by the image sensor 16 and that includes a plurality of light spots having widely varying intensities. Specifically, the light spots located in the center of the light beam are considerably much brighter than those located close to the periphery of the light beam. In such a case, calculating the intensity centroid of a either saturated or too dim light spot may yield inaccurate result, therefore, it is nearly impossible to accurately obtain all of the wavefront slopes associated with all of the light spots in a single camera exposure, adversely affecting an accuracy of the wavefront measurement. Therefore, the wavefront measurement of the to-be-tested optical element 13 would fail easily due to the non-uniform light spot distribution.

Therefore, it is desirable to reduce the overall cost for constructing the optical testing system 1 by eliminating the null corrector 12 while overcoming the uniformity problem of the light spot due to the excess optical aberration presenting in the tested light beam.

SUMMARY

One object of the disclosure is to provide a wavefront testing system with a lower cost and improved accuracy.

According to one embodiment of the disclosure, a wavefront testing system is for use with a to-be-tested optical element and includes a light source, an image capturing unit and a processing unit.

The light source is for generating alight beam. The light source is configured in a manner that the light beam is transmitted toward the to-be-tested optical element and becomes a non-uniform light beam after passing through the to-be-tested optical element.

The image capturing unit includes a lens array configured in a manner that the non-uniform light beam passes through the lens array to become a plurality of non-uniform light rays, and a sensor module configured to detect the light rays.

The processing unit is coupled to the light source and the image capturing unit, and is programmed to control the light source and the image capturing unit to operate in a plurality of different exposure conditions each associated with a distinct amount of exposure of light reaching the sensor module.

Specifically, the processing unit is further programmed to:

control the sensor module to detect the light rays under each of the exposure conditions, so a plurality of images each including a plurality of light spots are captured;

obtain, for each of the images, a plurality of light spot datasets from the sensor module, each of the light spot datasets corresponding to a respective one of the light spots, and includes a plurality of pixel coordinate sets that indicate locations of pixels covered by the respective one of the light spots and a plurality of pixel values corresponding respectively with the pixel coordinate sets; and obtain wavefront information associated with the light spots based on the light spot datasets of at least two of the images.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
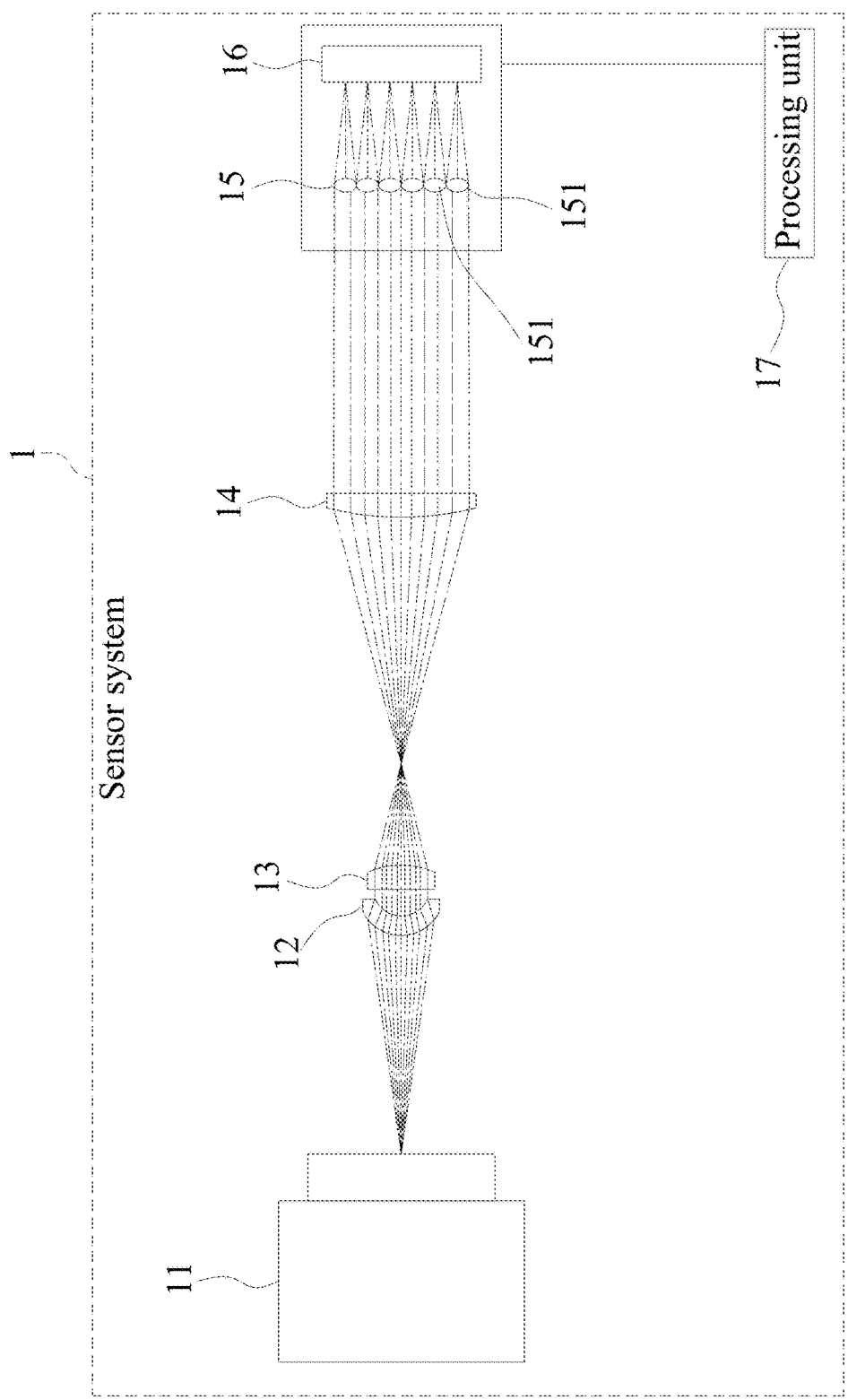
FIG. 1 is schematic view illustrating a conventional optical testing system for use with a to-be-tested optical element.
Figure 2:
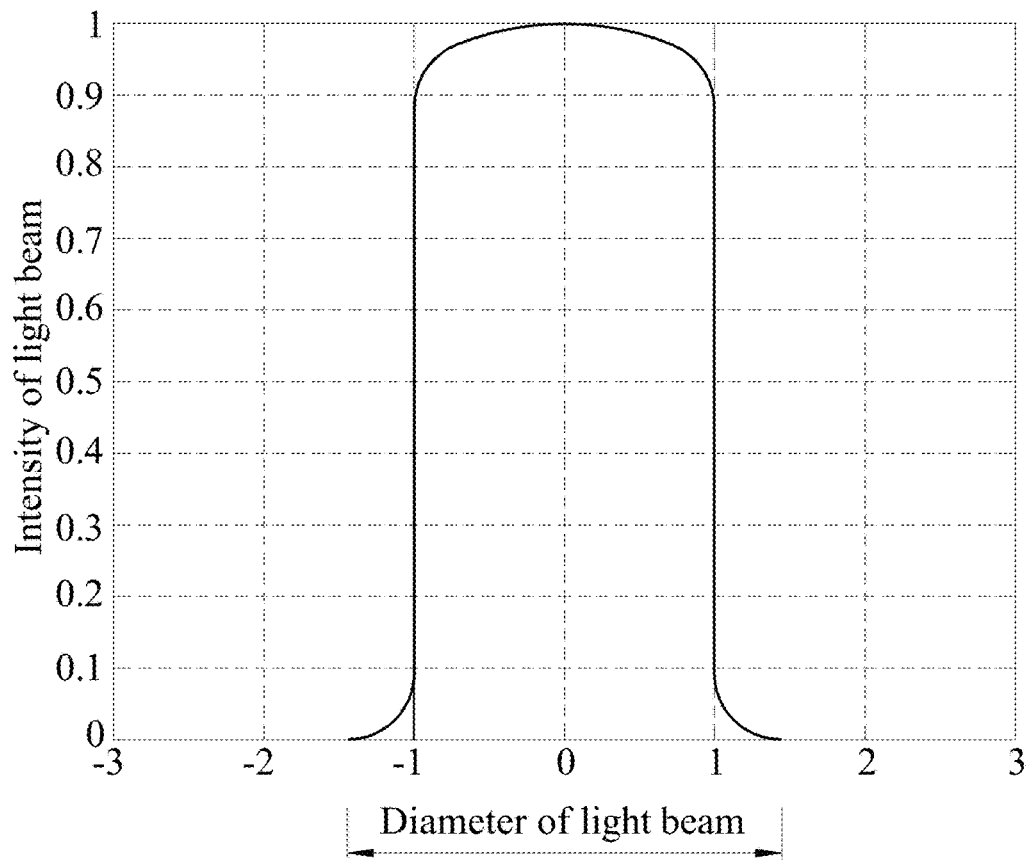
FIG. 2 is a plot illustrating an intensity of a light beam passing through a null corrector and a collimator before entering a micro lens array of FIG. 1.
Figure 3:
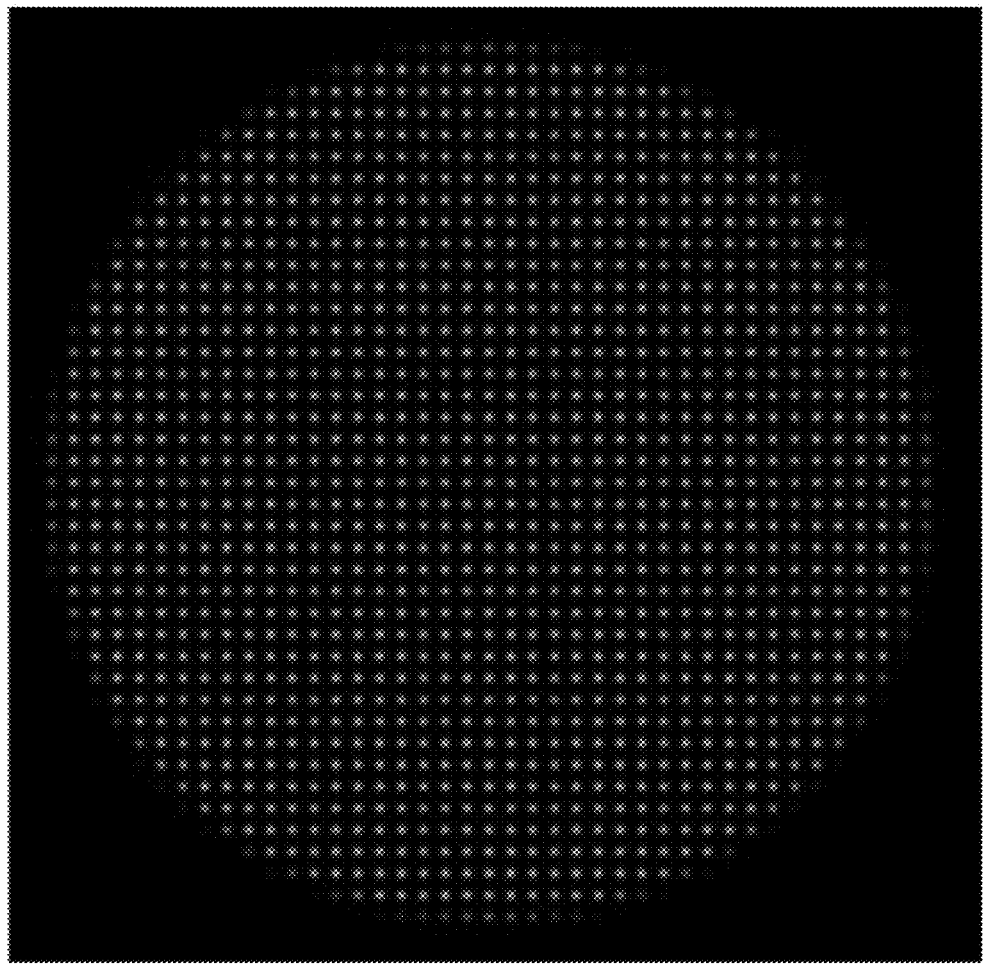
FIG. 3 illustrates a plurality of uniform light spots generated by the light beam entering the micro lens array of FIG. 1.
Figure 4:
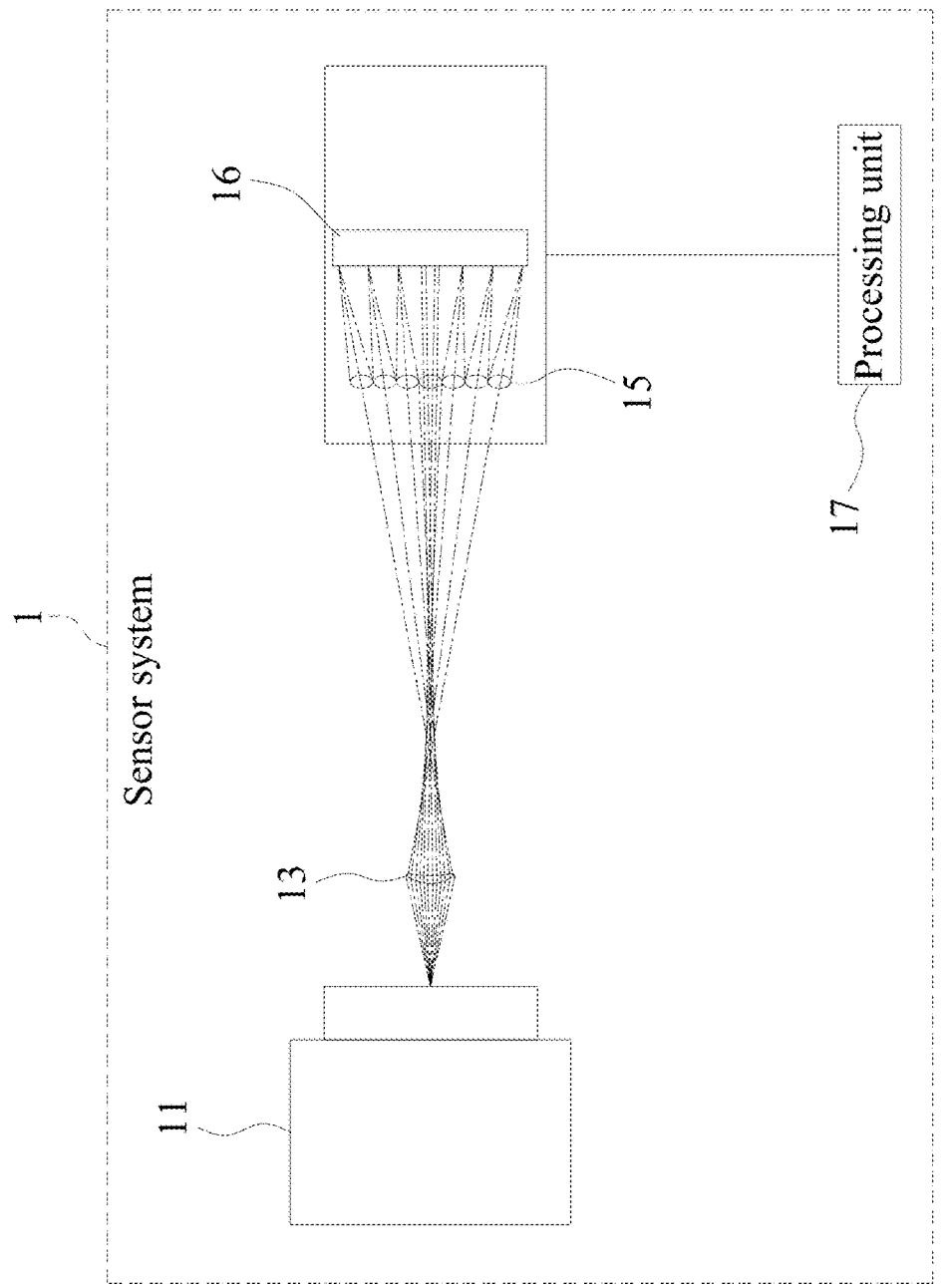
FIG. 4 is a schematic view illustrating a detecting system without the null corrector and the collimator.
Figure 5:
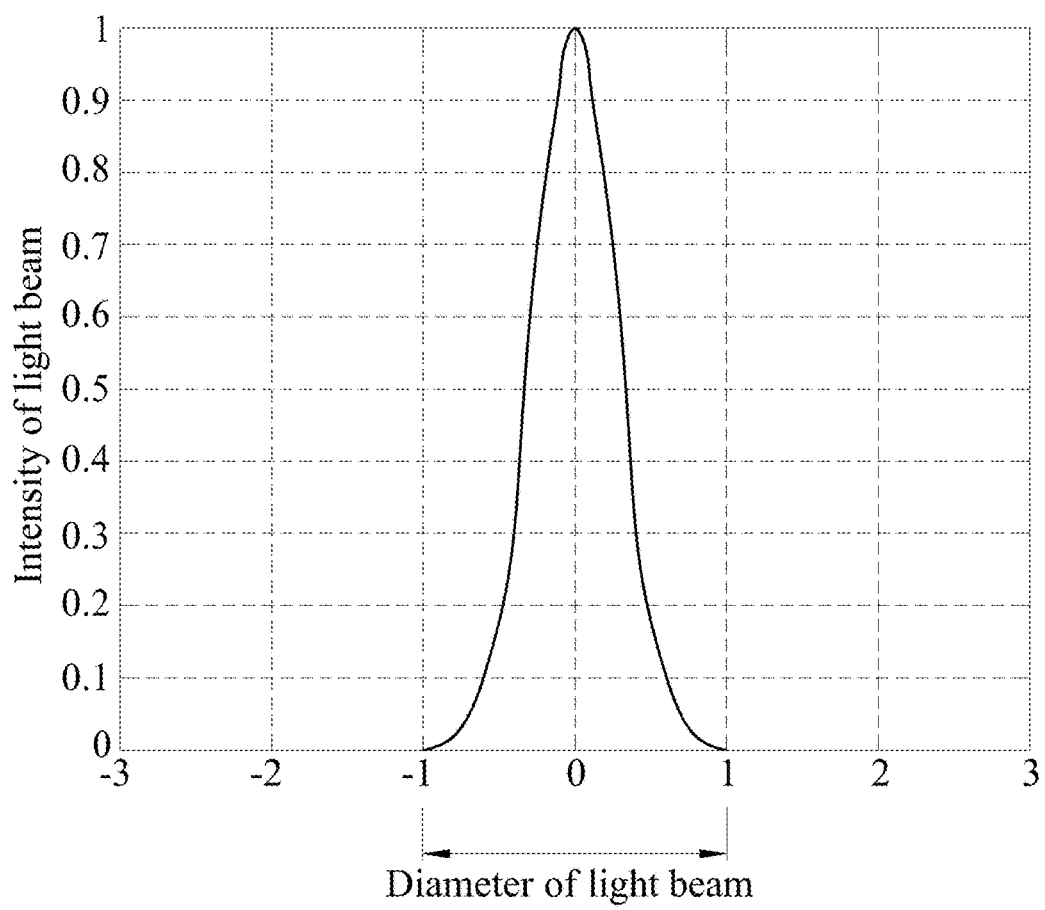
FIG. 5 is a plot illustrating an intensity of a light beam before entering a micro lens array of FIG. 4.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 7:
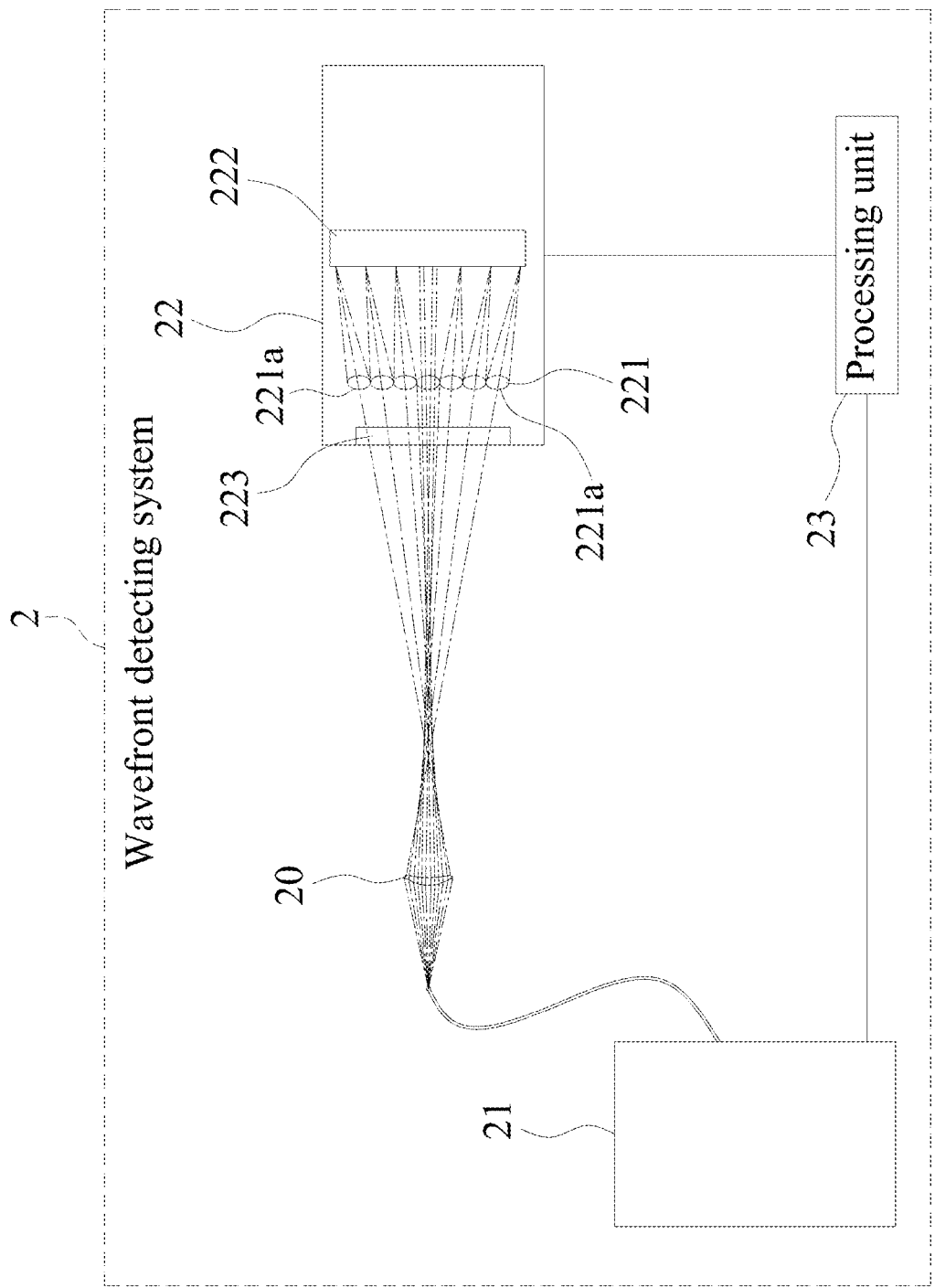
FIG. 7 is a schematic view illustrating a wavefront testing system according to one embodiment of the disclosure.

FIG. 7 is a schematic view of a wavefront testing system 2 for use with a to-be-tested optical element 20 according to one embodiment of the disclosure. The wavefront testing system 2 includes a light source 21, an image capturing unit 22 and a processing unit 23. In this embodiment, the to-be-tested optical element 20 is a lens such as a convex lens, and in other embodiments, additional to-be-tested optical elements may be incorporated therewith, forming a to-be-tested optical system.

The light source 21 is capable of generating alight beam that is transmitted toward the to-be-tested optical element 20 and becomes a non-uniform light beam due to optical aberration after passing through the to-be-tested optical element 20. That is to say, the to-be-tested optical element 20 is for generating aberrations that determine a uniformity of the light beam passing therethrough.

In this embodiment, the light source 21 is embodied using a point light source component made by an optical fiber coupled with a light source. In other embodiments, the light source 21 may generate a collimated light beam.

The image capturing unit 22 includes a lens array 221, a sensor module 222, and a shutter 223. The lens array 221 includes a plurality of lenses 221a, and the non-uniform light beam passes through the lens array 221 to become a plurality of non-uniform light rays. The sensor module 222 detects the light rays, and may be embodied using a charge-coupled device (CCD) or a complementary metal-oxide-semiconductor (CMOS) sensor. In this embodiment, the shutter 223 is embodied using a mechanical shutter, and may be embodied using an electronic shutter (i.e., to configure the sensor module 222 to have functions of the mechanical shutter) in other embodiments.

The processing unit 23 is coupled to the light source 21 and the image capturing unit 22, and controls the sensor module 222 to capture the light spots in a region of interest.

Figure 6:
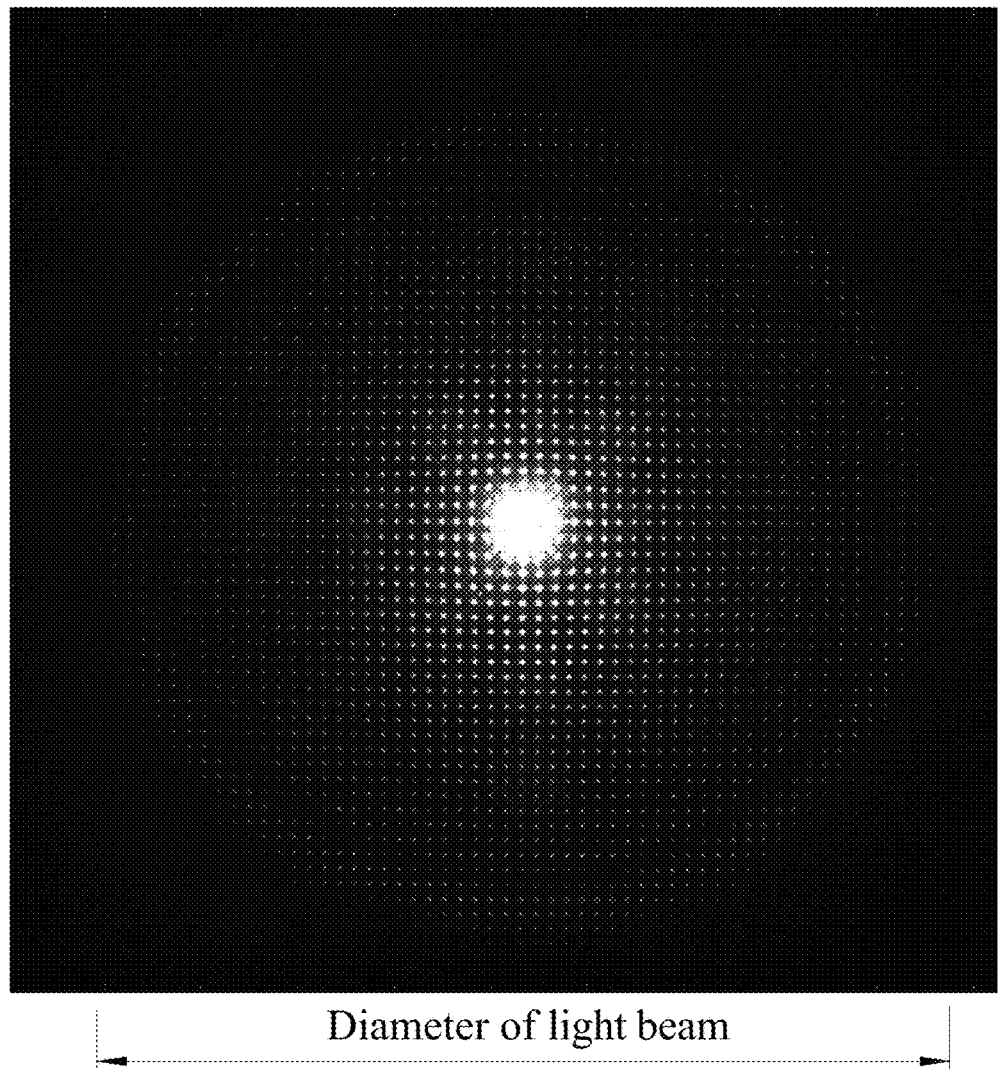
FIG. 6 illustrates a plurality of non-uniform light spots generated by the light beam entering the micro lens array of FIG. 4.

Specifically, the region of interest may be a circular area at the the the sensor module 222 onto which light beam is projected (see FIG. 6).

Moreover, the processing unit 23 controls the light source 21 and the image capturing unit 22 to operate in a plurality (e.g., a number (L)) of different exposure conditions, each associated with a distinct amount of exposure of light reaching the sensor module 222. In this embodiment, the exposure conditions are changed by adjusting a shutter speed of the shutter 223 and/or an intensity of the light beam generated by the light source 21.

The processing unit 23 controls the sensor module 222 to detect the light rays under each of the exposure conditions, so a plurality of images, each including a plurality of light spots, are generated. Controlling the sensor module 222 to detect the light rays under a plurality of different exposure conditions is to achieve the effect that for a specific location within the region of interest, at least one light spot that satisfies a predetermined criterion is found among the plurality of images. In this embodiment, the predetermined criterion for the light spot is that a pixel value associated with the light spot is within a predetermined range. In this embodiment, the predetermined range may be from half of the maximum pixel value to a maximum pixel value. For example, when the image is represented in 8-bit grayscale resolution, the maximum pixel value is 255, and the predetermined range is from 128 to 255.

In this embodiment, the light source 21 is a point light source emitted from a single-mode optical fiber coupled to a laser diode. Light beam generated by such a light source 21 has an intensity profile in the shape of a Gaussian. The numerical aperture (NA) of the light beam is larger than the entrance pupil of the to-be-tested optical element 20. In a case that the to-be-tested optical element 20 has a spherical aberration, the ray distribution of the light beam exiting the optical element 20 becomes less uniform than the light beam entering the entrance pupil of the optical element 20. Therefore, considering a uniform sampled ray-tracing grid at the entrance pupil of the to-be-tested optical element 20, the traced ray coordinate grid at the exit pupil of the to-be-tested optical element 20 will be distorted due to the aberration, forming the so called pupil distortion. Therefore, the ray distribution, equivalently the intensity profile, of the light beam will be non-uniform after the light beam propagates through the to-be-tested optical element 20.

Figure 8:
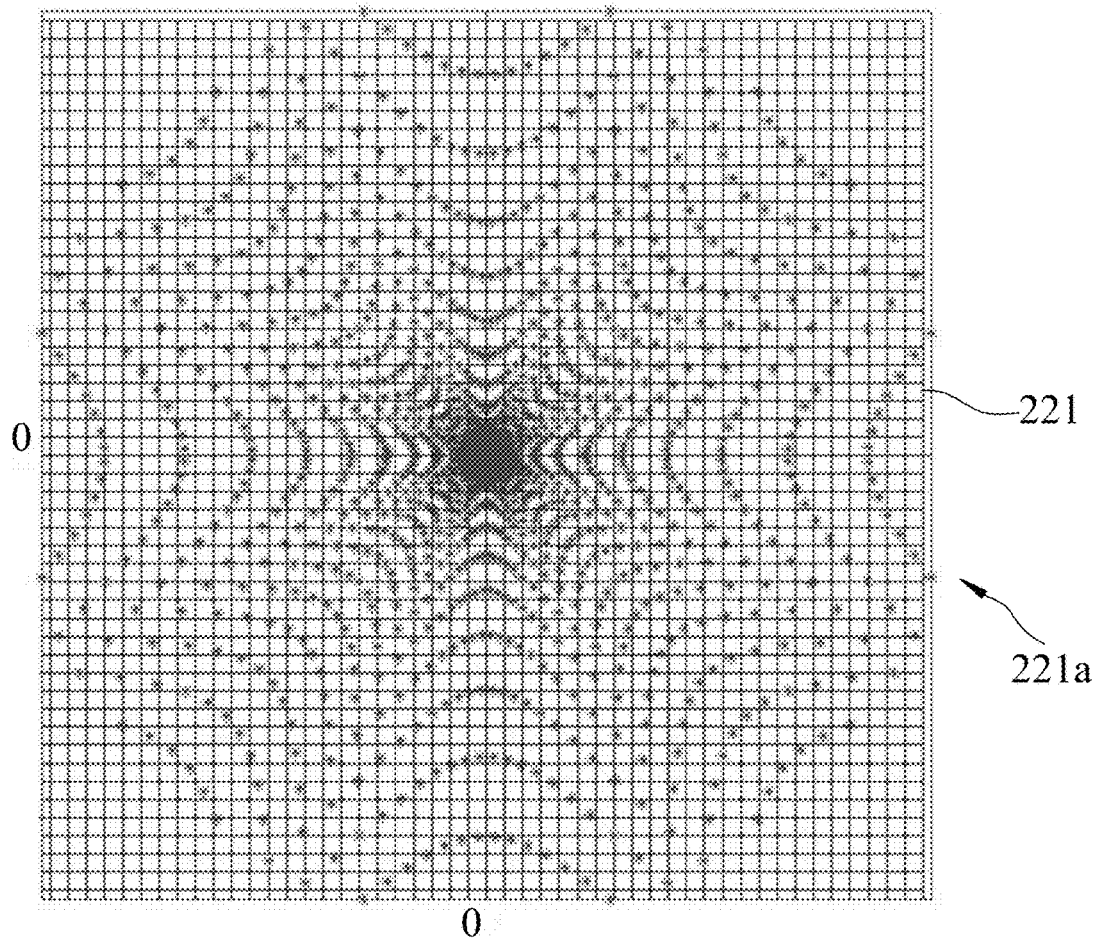
FIG. 8 illustrates rays of a non-uniform optical beam incident on various locations of a micro lens array.
Figure 9:
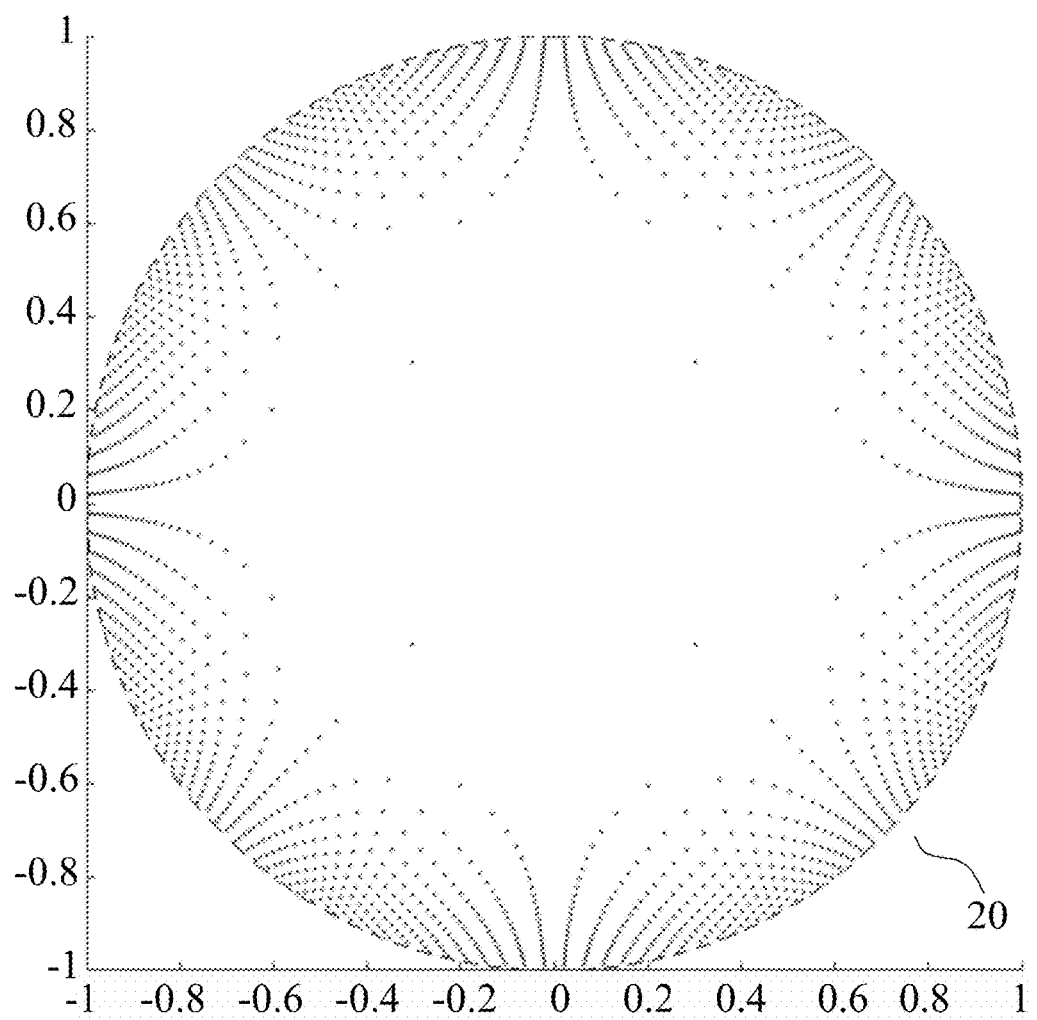
FIG. 9 illustrates a wavefront sampling density associated with a to-be-tested optical element.

In one example, the to-be-tested optical element 20 is a convex lens producing the positive spherical aberration as shown in FIG. 7. Accordingly, the light beam passing through the to-be-tested optical element 20 propagates to the lens array 221, and the resulting light spots have a larger spot irradiance at the center of the corresponding image than the periphery of the image. In addition, for aspherical or negative lens with negative spherical aberration, it may be possible to have more spot irradiance near the edge of the corresponding image than the center of the image. It is noted that, the light beam exiting the to-be-tested optical element 20 and entering the lens array 221 has a ray-to-ray correspondence. When the irradiance on the center of the image is stronger than that on the edge, most of the rays of the light beam is projected onto the center of the lens array 221 as shown in FIG. 8. As a result, most of the lenses 221*a* of the lens array 221 acquire the rays near the edge of the entrance pupil of optical element 20. Therefore, in the aspect of the wavefront sampling density defined by spacing between the lenses 221*a*, the wavefront sampling density near the edge of the entrance pupil of the to-be-tested optical element 20 is significantly higher than the central region as shown in FIG. 9. Thus, the light spot sampling density on the lenses 221*a* over the entrance pupil of the to-be-tested optical element 20 is not uniform. This phenomenon is beneficial in, for example, observing a misalignment (decenter and tilt) of both surfaces of the lens or testing near the edge of the lens, since for specific optical elements such as an aspheric lens, a maximum aspheric departure typically occurs at an edge of an entrance pupil thereof. Nonetheless, conventional wavefront measurement requires a null corrector to offset the optical aberration of the optical element, and/or a collimator to turn the light beam passing therethrough into collimated light, and is therefore unable to achieve the effect of increased wavefront sampling density over the to-be-tested optical element 20. It is then desirable to determine a preset optical conjugate distance to serve as an object distance between the light source 21 and the to-be-tested optical element 20, in order to optimize aberration of wavefront passing through the to-be-tested optical element 20, and to enable the sensor module 222 to detect complete light beam and more of the rays from the edge of the entrance pupil of the to-be-tested optical element 20 so as to increase a sensitivity of testing implemented by the wavefront testing system 2. When a point light source is used, the preset optical conjugate distance can be achieved by adjusting an axial location of the light source 21 with respect to the to-be-tested optical element 20. However, when an object distance of the light source is at a point of infinity (or an ideal point), a collimated light beam source may be employed. For example, when the object distance of the point light source is behind the to-be-tested optical element 20, a light source that is capable of generating a converging light beam and generating a virtual object behind the to-be-tested optical element 20 may be deployed. In addition, it is noted that this particular measuring mechanism may cause most of the rays to be incident onto a few of the lenses 221*a* located near the center of the lens array 221, significantly lowering the wavefront sampling density within a certain region of the entrance pupil of the to-be-tested optical element 20, even close to none. On the other hand, since the wavefront sampling density accordingly becomes non-uniform in favor of the measurement sensitive region of the pupil, the overall accuracy/precision of the measurement implemented by the wavefront testing system 2 is improved.

In the case that the optical aberration causes the spot image to be non-uniform, to record the light spots with a strong light irradiance and the light spots with a weak light irradiance within the region of interest on the sensor module 222, the exposure value of image has to be changed according to the irradiance of each spot. Therefore, to complete capture of all the spots of different irradiance, it is required to have multiple images of different exposure values within an exposure range forming the plurality of exposure conditions. In particular, the exposure range can be represented by a ratio of a maximum exposure value to a minimum exposure value that is related to (e.g., substantially equal to) a ratio of the maximum light spot irradiance to the minimum light irradiance within the region of interest. In this manner, it can be sure that every light spot within the region of interest may be recorded within the optimal dynamic range of the sensor module 222, avoiding excessive saturation or insufficiency of pixel values of different light spots. Given the dynamic range (DR) of the sensor module 222, the ratio of the maximum exposure value to the minimum exposure value of the exposure conditions may be 0.5 to 2 times the ratio of the maximum light irradiance to the minimum light irradiance within the region of interest of the sensor module 222. In other embodiments, the processing unit 23 selects, for the light spots in the images that correspond to a same lens 221a, at least one candidate light spot dataset from among light spot datasets of the light spots according to the predetermined criterion. Afterward, the processing unit 23 generates a synthesized image based on the at least one candidate light spot dataset thus selected. The synthesized image may then be used for calculation of a centroid of each of the light spots. Also, one can use the synthesized image to evaluate the quality of the light spot of each lens 221a in a comprehensive way.

Given each exposure condition, multiple images can be acquired in order to average out and suppress the noise of the sensor module 222. Therefore, it is worthwhile to note that the number (L) of the exposure conditions of different exposure values directly affects the time required to capture the wavefront being tested. As the number (L) increases, a number (M) of images acquired also increases proportionally, taking up more time. It is then desired to keep the number (L) minimized while obtaining all the required images. In this embodiment, the predetermined criterion is that a pixel value associated with the light spot is set within the predetermined range for acquisition (i.e., between the maximum pixel value and the half of the maximum pixel value). As a result, the processing unit 23 may be programmed to, for the number (L) of the exposure conditions, adjust the amount of exposure in a non-linear manner. For example, a geometric sequence may be employed such that the amount of exposure for a $j^{th}$ one of the exposure conditions is equal to $K^j$, and $1 \leq j \leq L$. In this embodiment, K is nearly a constant that ranges from 1 to 3 given that 2 is an optimal value for K.

It is noted that in this embodiment, the adjustment of the amount of exposure may be done by decreasing the shutter speed of the shutter 223 in a non-linear manner, or by increasing the intensity of the light beam generated by the light source 21 in a non-linear manner. In other embodiments, the adjustment of the amount of exposure may be done by increasing the shutter speed of the shutter 223 in a non-linear manner, or by decreasing the intensity of the light beam generated by the light source 21 in a non-linear manner. The processing unit 23 may include a first signal generator for generating a first control signal to control operations of the shutter 223, and a second signal generator for generating a second control signal to control operations of the light source 21.

In one embodiment, the shutter speed of the shutter 223 is kept constant in order to maximize an acquisition frame rate of images. Accordingly, in the condition that the ratio of the maximum exposure value to the minimum exposure value may be 0.5 to 2 times the ratio of the maximum light intensity to the minimum light intensity, the processing unit 23 may control the light source 21 to periodically vary the intensity of the light beam. For example, an intensity modulation period for the light source 21 may be made to match a period needed for the sensor module 222 to acquire the number (M) of images. In this manner, the operations of the light source 21 and the image capturing unit 22 may be separately controlled in an open-loop and non-synchronized way, in order to acquire all images within the predetermined exposure conditions more efficiently at the maximum throughput.

The processing unit 23 controls the sensor module 222 to detect the light rays within the region of interest under each of the number (L) of exposure conditions, so a plurality of images each including a plurality (e.g., a number (N)) of light spots are acquired. For each light spot, a corresponding light spot dataset including a plurality of pixel coordinate sets that indicate the locations of pixels corresponding to the light spot and a plurality of pixel values within the pixel coordinate sets, may be obtained by the processing unit 23 from the sensor module 222. In various embodiments, for each of the exposure conditions, one or more images maybe acquired. In the cases that multiple spot images are acquired for one particular exposure condition of a single spot, the multiple spot images may be merged into a single one by calculating the average of the pixel values corresponding to the same pixel coordinate set in the images. Afterward, the merged spot image can also be used for calculating a centroid of each light spot.

For each image, an $i^{th}$ one of the light spots corresponds to an $i^{th}$ light spot dataset, $1 \leq i \leq N$. The $i^{th}$ light spot dataset includes a number (P) of pixel coordinate sets (denoted by $(L_r^{i,j})$) that indicate pixels covered by the respective one of the light spots, and a plurality of pixel values (denoted by $(V_r^{i,j})$) corresponding respectively with the pixel coordinate sets, where $1 \leq r \leq P$. In this embodiment, the processing unit 23 is programmed to obtain wavefront information of the light beam based on at least two of the light spot datasets for each of the images. Specifically, for the $i^{th}$ one of the light spots, the processing unit 23 calculates an $i^{th}$ centroid associated with the $i^{th}$ one of the light spots.

Figure 10:
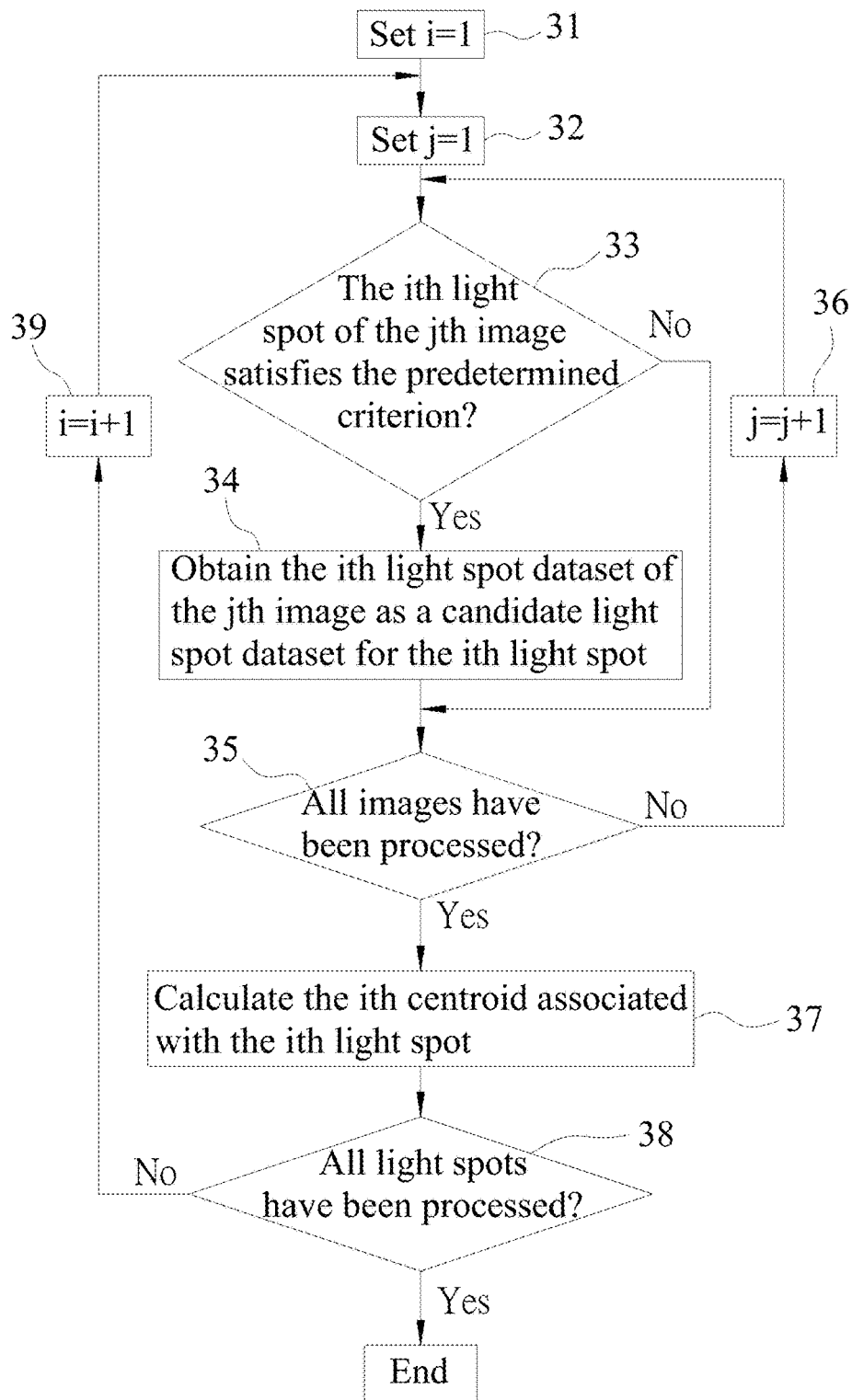
FIG. 10 is a flow chart illustrating a process for calculating centroids for a plurality of light spots according to one embodiment of the disclosure.

FIG. 10 is a flow chart illustrating a process for calculating the centroids of the light spots in the images generated by the system of FIG. 7 according to one embodiment of the disclosure.

In step 31, the processing unit 23 sets i=1, indicating a $1^{st}$ one of the light spots.

In step 32, the processing unit 23 sets j=1, indicating a $1^{st}$ of the images.

In step 33, the processing unit 23 determines whether the $i^{th}$ light spot of the $j^{th}$ image satisfies the predetermined criterion. When it is determined that the $i^{th}$ light spot of the $j^{th}$ image satisfies the predetermined criterion, the flow proceeds to step 34. Otherwise, the flow proceeds to step 35.

In step 34, the processing unit 23 obtains the $i^{th}$ light spot dataset of the $j^{th}$ image as a candidate light spot dataset corresponding to the $i^{th}$ light spot. Afterward, the flow proceeds to step 35.

In step 35, the processing unit 23 determines whether all of the number (M) of images have been processed, that is, whether j equals M. When it is determined that j=M, the flow proceeds to step 37. Otherwise, the flow proceeds to step 36.

In step 36, the processing unit 23 increases j by one (i.e., j=j+1), indicating a next one of the images. Afterward, the flow goes back to step 33 for determining whether the $i^{th}$ light spot of the next one of the images satisfies the predetermined criterion.

In step 37, according to all of the candidate light spot datasets obtained for the $i^{th}$ light spot in step 34, the processing unit 23 calculates an $i^{th}$ centroid associated with the $i^{th}$ light spots of the (M) number of images.

Specifically, in this embodiment, the processor unit 23 calculates an average pixel value $\overline{V}_r^i$ for an $r^{th}$ one of the pixel coordinate sets $V_r^{i,j}$. For example, assuming that the $1^{st}$ light spots from the $1^{st}$ image, the $8^{th}$ image and the $12^{th}$ image are selected as candidate light spots, and the corresponding light spot datasets are obtained, the processor unit 23 processes the number (P) of pixels covered in each of the $1^{st}$ light spots. For each one of the pixels, the processor unit 23 calculates an average pixel value $\overline{V}_r^1$, represented by the following equation.

$$(V_r^{1,1} + V_r^{1,8} + V_r^{1,12})/3, \ 1 \leq r \leq P$$

Then, the processor unit 23 calculates the centroid associated with the $1^{st}$ light spot using the number (P) of average pixel values as calculated above. In another embodiment, the processor unit 23 may calculate one centroid for each of the $1^{st}$ light spots respectively from the $1^{st}$ image, the $8^{th}$ image and the $12^{th}$ image, and calculate an average position of the centroids calculated above (e.g., averaging the coordinate values of the three centroids).

After the centroid associated with a specific light spot is calculated, the flow proceeds to step 38, in which the processing unit 23 determines whether all of the number (N) of light spots have been processed, that is, whether i equals N. When it is determined that i=N, the process is terminated. Otherwise, the flow proceeds to step 39.

In step 39, the processing unit 23 increases i by one (i.e., i=i+1), indicating a next one of the light spots, and the flow goes back to step 32.

In one example, it is assumed that M=5 and N=2, that is, five images (numbered 1 to 5) are generated, each including two light spots (i.e., a first light spot and a second light spot). The processing unit 23 determines whether a first candidate image that has the first light spot dataset satisfying the predetermined criterion exists among the images. When it is determined that, for example, the $1^{st}$ and $2^{nd}$ images of the five images each have the first light spot dataset satisfying the predetermined criterion (i.e., it is determined that the $1^{st}$ and $2^{nd}$ images qualify as first candidate images), the processing unit 23 obtains the candidate light spot datasets associated with the first light spots of the first candidate images, and calculates the centroid associated with the first light spot based on the first candidate light spot datasets. Then, the processing unit 23 determines whether a second candidate image that has the second light spot dataset satisfying the predetermined criterion exists among the five images. When it is determined that, for example, the $3^{rd}$ and $5^{th}$ images of the five images each have the second light spot dataset satisfying the predetermined criterion (i.e., it is determined that the $3^{rd}$ and $5^{th}$ images qualify as second candidate images), the processing unit 23 obtains the candidate light spot datasets corresponding to the second light spots of the second candidate images, and calculates the centroid associated with the second light spot.

After the centroids associated with all of the light spots have been calculated, the processing unit 23 obtains wavefront information associated with the light spots based on the centroids associated with all of the light spots. Particularly, the wavefront information includes a wavefront slope of light incident on a corresponding one of the lenses 221a of the lens array 221. In various embodiments, the wavefront information may include other information such as a wavefront phase reconstructed from the wavefront slope and/or a wavefront intensity measured from the spot irradiance.

Figure 11:
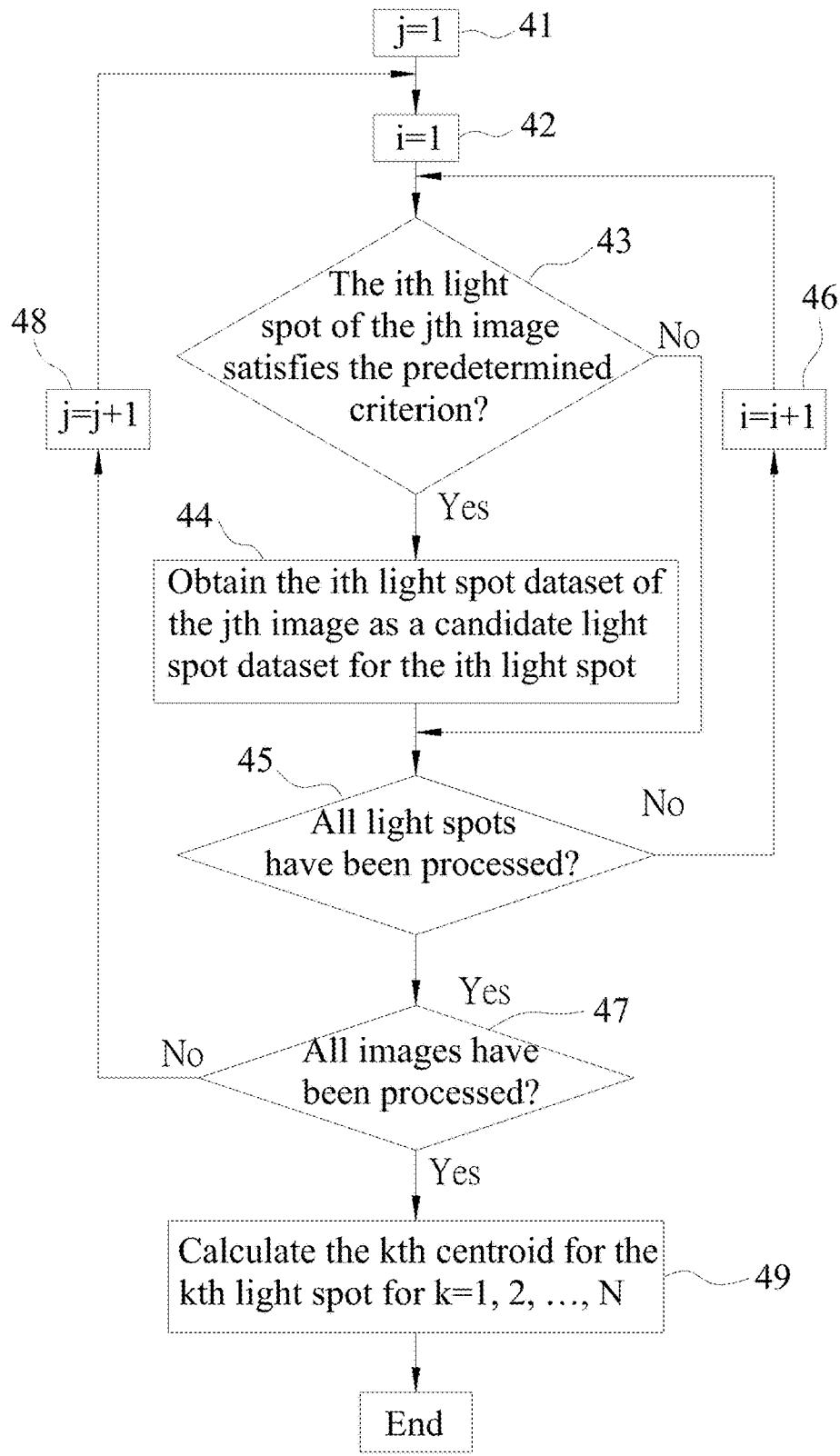
FIG. 11 is a flow chart illustrating an alternative process for calculating the centroids for the light spots according to one embodiment of the disclosure.

FIG. 11 is a flowchart illustrating a process for calculating the centroids of the light spots in the images generated by the system of FIG. 7 according to one embodiment of the disclosure.

In step 41, the processing unit 23 sets j=1, indicating a $1^{st}$ image.

In step 42, the processing unit 23 sets i=1, indicating a $1^{st}$ light spot.

In step 43, the processing unit 23 determines whether the $i^{th}$ light spot of the $j^{th}$ image satisfies the predetermined criterion. When it is determined that the $i^{th}$ light spot of the $j^{th}$ image satisfies the predetermined criterion, the flow proceeds to step 44. Otherwise, the flow proceeds to step 45.

In step 44, the processing unit 23 obtains the $i^{th}$ light spot dataset of the $j^{th}$ th image as a candidate light spot dataset corresponding to the $i^{th}$ light spot. Afterward, the flow proceeds to step 45.

In step 45, the processing unit 23 determines whether all of the number (N) of light spots of the $j^{th}$ image have been processed, that is, whether i equals N. When it is determined that i=N, the flow proceeds to step 47. Otherwise, the flow proceeds to step 46.

In step 46, the processing unit 23 increases i by one (i.e., i=i+1), indicating that a next one of the light spots (e.g., the $2^{nd}$ light spot) will be processed next. Afterward, the flow goes back to step 43 for determining whether the next light spot of the $j^{th}$ image satisfies the predetermined criterion.

In step 47, the processing unit 23 determines whether all of the number (M) of images have been processed, that is, whether j equals M. When it is determined that j=M, the flow proceeds to step 49. Otherwise, the flow proceeds to step 48.

In step 48, the processing unit 23 increase j by one (i.e., j=j+1), indicating a next one of the images (e.g., the $2^{nd}$ image) will be processed next. Afterward, the flow goes back to step 42.

In step 49, with all of the candidate light spot datasets selected from all images for the $i^{th}$ light spot, the processing unit 23 calculates an $k^{th}$ centroid associated with the $k^{th}$ light spots of the (M) number of images, k=1, 2, . . . , N.

In one example, it is assumed that M=5 and N=2, that is, 5 images (numbered 1 to 5) are generated, each including 2 light spots (i.e., a first light spot and a second light spot). Accordingly, for each of the images, the processing unit 23 determines whether each of the first light spot dataset and the second light spot dataset satisfies the predetermined criterion. When the first light spot dataset satisfies the predetermined criterion, the processing unit 23 selects the first light spot dataset as the candidate light spot dataset corresponding to the first light spot. When the second light spot dataset satisfies the predetermined criterion, the processing unit 23 selects the second light spot dataset as the candidate light spot dataset corresponding to the second light spot. In this example, the processing unit 23 may sequentially select the first light spot dataset of the $1^{st}$ image as a candidate light spot dataset corresponding to the first light spot, select the first light spot dataset of the $2^{nd}$ image as another candidate light spot dataset corresponding to the first light spot, select the second light spot dataset of the $3^{rd}$ image as a candidate light spot dataset corresponding to the second light spot, select none of the first light spot dataset and the second light spot dataset of the $4^{th}$ image, and select the second light spot dataset of the $5^{th}$ image as another candidate light spot dataset corresponding to the second light spot.

Afterward, the processing unit 23 calculates the first centroid associated with the first light spot based on the candidate light spot dataset(s) selected above for the first light spot (i.e., the first light spot datasets from the $1^{st}$ image and the $2^{nd}$ image), and calculates the second centroid associated with the second light spot based on the candidate light spot dataset(s) selected above for the second light spot (i.e., the second light spot datasets from the $3^{rd}$ image and the $5^{th}$ image). Then, the wavefront information may be obtained from the first centroid and the second centroid.

To sum up, the wavefront testing system 2 as described in the disclosure is configured to generate one or more images for each of the number (L) of the exposure conditions, and to obtain the wavefront information based on the light spot databases of at least two of the resulting (M) images. In this manner, the wavefront testing system 2 is capable of obtaining the light spot datasets satisfying the predetermined criterion without using a null corrector or a collimator, reducing the costs of the wavefront testing system 2 and potential risks of errors. Additionally, the wavefront testing system 2 is suitable for testing with the non-uniformity of the light beam passing through the to-be-tested optical element 20 resulted from the aberrations of the to-be-tested optical element 20.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A wavefront testing system for use with a to-be-tested optical element, comprising:
   a light source for generating a light beam that is transmitted toward the to-be-tested optical element;
   a to-be-tested optical element for generating aberrations that determine a uniformity of the light beam passing therethrough;
   an image capturing unit including a lens array through which the light beam passes to become a plurality of light spots, and a sensor module for detecting the light spots; and
   a processing unit coupled to said light source and said image capturing unit, and controlling said light source and said image capturing unit to operate in a plurality of different exposure conditions each associated with a distinct amount of exposure of images acquired by said sensor module;
   wherein said processing unit executes the following operations of
      controlling said sensor module to acquire the light spots under each of the exposure conditions, so a plurality of images each including a plurality of light spots are acquired,
      obtaining, for each of the images, a plurality of light spot datasets from said sensor module, each of the light spot datasets corresponding to a respective one of the light spots and including a plurality of pixel coordinate sets that indicate locations of pixels covered by the respective one of the light spots and a plurality of pixel values corresponding respectively with the pixel coordinate sets, and
      obtaining wavefront information associated with the light spots based on the light spot datasets of at least two of the images.

2. The wavefront testing system of claim 1, wherein said light source is disposed to be distanced from the to-be-tested optical element by a preset optical conjugate distance, such that a light spot sampling density of said lens array on a periphery of an entrance pupil of the to-be-tested optical element is different from that on a center of the entrance pupil of the to-be-tested optical element.

3. The wavefront testing system of claim 1, wherein the wavefront information includes one of a wavefront slope, a wavefront phase, a wavefront intensity, and any combination thereof.

4. The wavefront testing system of claim 1, wherein:
   said processing unit controls said sensor module to detect the light rays in a region of interest under each of the exposure conditions; and
   a ratio of a maximum exposure value to a minimum exposure value is determined by a ratio of a maximum light irradiance of the region of interest to a minimum light irradiance of the region of interest, the maximum exposure value being a greatest one of the amounts of exposure associated with the plurality of exposure conditions, the minimum exposure value being a smallest one of the amounts of exposure associated with the plurality of exposure conditions.

5. The wavefront testing system of claim 1, wherein:
   the light spots of each of the images include at least a first light spot and a second light spot, and the light spot datasets for each of the images include at least a first light spot dataset and a second light spot dataset corresponding to the first light spot and the second light spot of the image, respectively; and
   said processing unit selects at least one first candidate light spot dataset from among the first light spot datasets of the images and at least one second candidate light spot dataset from among the second light spot datasets of the images according to a predetermined criterion, and generates a synthesized image based on at least the first candidate light spot dataset and the second candidate light spot dataset.

6. The wavefront testing system of claim 5, wherein the predetermined criterion includes that one of a maximum and an average of the pixel values included in the light spot dataset is within a predetermined range.

7. The wavefront testing system of claim 1, wherein:
   said image capturing unit further includes a shutter; and
   said processing unit is coupled to said shutter, and controls said light source and said image capturing unit to operate in the exposure conditions by adjusting one of a shutter speed of said shutter, an intensity of the light beam generated by said light source, and a combination thereof.

8. The wavefront testing system of claim 7, wherein said processing unit keeps the shutter speed constant and controls said light source to periodically modulate the intensity of the light beam.

9. The wavefront testing system of claim 7, wherein said processing unit adjusts one or both of the shutter speed of said shutter, and the intensity of the light beam generated by said light source in a non-linear manner.

10. The wavefront testing system of claim 9, wherein for a number (L) of exposure conditions, the amount of exposure for the $j^{th}$ one of the exposure conditions is equal to $K^j$, where K is a constant between 1 and 3, and $1 \leq j \leq N$.

11. The wavefront testing system of claim 1, wherein:
   the light spots of each of the images include at least a first light spot and a second light spot, and the light spot datasets for each of the images include at least a first light spot dataset and a second light spot dataset corresponding to the first light spot and the second light spot of the image, respectively; and said processing unit selects at least one first candidate light spot dataset from among the first light spot datasets of the images and at least one second candidate light spot dataset from among the second light spot datasets of the images according a predetermined criterion, and generates the wavefront information based on the at least one first candidate light spot dataset and the at least one second candidate light spot dataset.

12. The wavefront testing system of claim 11, wherein said processing unit determines whether a first candidate image that has the first light spot dataset satisfying the predetermined criterion exists among the images, and obtains the first candidate light spot dataset associated with the first light spot of the first candidate image when it is determined that the first candidate image exists;
wherein said processing unit further determines whether a second candidate image that has the second light spot dataset satisfying the predetermined criterion exists among the images, and obtains the second candidate light spot dataset associated with the second light spot of the second candidate image when it is determined that the second candidate image exists.

13. The wavefront testing system of claim 11, wherein the predetermined criterion includes that one of a maximum and an average of the pixel values included in the light spot dataset is within a predetermined range.

14. The wavefront testing system of claim 11, wherein:
said processing unit calculates a first centroid associated with the first light spots of the images based on the at least one first candidate light spot dataset, and calculates a second centroid associated with the second light spots of the images based on the at least one second candidate light spot dataset; and
the wavefront information is obtained from the first centroid and the second centroid.

15. The wavefront testing system of claim 14, wherein:
in calculating the first centroid, said processing unit executes the following operations of
when the at least one first candidate light spot dataset includes a plurality of first candidate light spot datasets, calculating a plurality of first average pixel values each associated with one of the pixel coordinate sets, each of the first average pixel values being calculated by obtaining, from each of the first candidate light spot datasets, a pixel value that corresponds to the one of the pixel coordinate sets with which the first average pixel value is associated, and by calculating an average of the pixel values thus obtained, and
calculating the first centroid based on the plurality of first average pixel values; and
in calculating the second centroid, said processing unit executes the following operations of
when the at least one second candidate light spot dataset includes a plurality of second candidate light spot datasets, calculating a plurality of second average pixel values each associated with one of the pixel coordinate sets, each of the second average pixel values being calculated by obtaining, from each of the second candidate light spot datasets, a pixel value that corresponds to the one of the pixel coordinate sets with which the second average pixel value is associated, and by calculating an average of the pixel values thus obtained, and
calculating the second centroid based on the plurality of second average pixel values.

16. The wavefront testing system of claim 14, wherein:
in calculating the first centroid, said processing unit executes the following operations of
when the at least one first candidate light spot dataset includes a plurality of first candidate light spot datasets, for each of the first candidate light spot datasets, calculating a centroid of the first light spot, and
calculating an average of the centroids of the first candidate light spots to serve as the first centroid; and
in calculating the second centroid, said processing unit executes the following operations of
when the at least one second candidate light spot dataset includes a plurality of second candidate light spot datasets, for each of the second candidate light spot datasets, calculating a centroid of the second light spot, and
calculating an average of the centroids of the second candidate light spots to serve as the second centroid.

17. The wavefront testing system of claim 11, wherein, for each of the images, said processing unit determines whether each of the first light spot dataset and the second light spot dataset satisfies the predetermined criterion, selects the first light spot dataset as the first candidate light spot dataset when the first light spot dataset satisfies the predetermined criterion, and selects the second light spot dataset as the second candidate light spot dataset when the second light spot dataset satisfies the predetermined criterion.

18. The wavefront testing system of claim 17, wherein the predetermined criterion includes that one of a maximum and an average of the pixel values included in the light spot dataset is within a predetermined range.

19. The wavefront testing system of claim 17, wherein:
said processing unit calculates a first centroid associated with the first light spots of the images based on the at least one first candidate light spot dataset, and calculates a second centroid associated with the second light spots of the images based on the at least one second candidate light spot dataset; and
the wavefront information is obtained from the first centroid and the second centroid.

20. The wavefront testing system of claim 19, wherein:
in calculating the first centroid, said processing unit executes the following operations of
when the at least one first candidate light spot dataset includes a plurality of first candidate light spot datasets, calculating a plurality of first average pixel values each associated with one of the pixel coordinate sets, each of the first average pixel values being calculated by obtaining, from each of the first candidate light spot datasets, a pixel value that corresponds to the one of the pixel coordinate sets with which the first average pixel value is associated, and by calculating an average of the pixel values thus obtained, and
calculating the first centroid based on the plurality of first average pixel values; and
in calculating the second centroid, said processing unit executes the following operations of
when the at least one second candidate light spot dataset includes a plurality of second candidate light spot datasets, calculating a plurality of second average pixel values each associated with one of the pixel coordinate sets, each of the second average pixel values being calculated by obtaining, from each of the second candidate light spot datasets, a pixel value that corresponds to the one of the pixel coordinate sets with which the second average pixel value is associated, and by calculating an average of the pixel values thus obtained, and calculating the second centroid based on the plurality of second average pixel values.

\* \* \* \* \*